US007375484B2

(12) United States Patent
Murray

(10) Patent No.: US 7,375,484 B2
(45) Date of Patent: May 20, 2008

(54) SYSTEM AND METHOD FOR UNATTENDED CONTROL OF AN ACCESS BARRIER

(75) Inventor: James S. Murray, Milton, FL (US)

(73) Assignee: Wayne-Dalton Corp., Mt. Hope, OH (US)

( * ) Notice: Subject to any disclaimer, the term of this patent is extended or adjusted under 35 U.S.C. 154(b) by 0 days.

(21) Appl. No.: 11/486,132

(22) Filed: Jul. 13, 2006

(65) Prior Publication Data

US 2008/0012515 A1 Jan. 17, 2008

(51) Int. Cl.
*H02P 1/04* (2006.01)

(52) U.S. Cl. ........................................ 318/466; 318/445

(58) Field of Classification Search ................. 318/466
See application file for complete search history.

(56) References Cited

U.S. PATENT DOCUMENTS

| | | | | |
|---|---|---|---|---|
| 5,510,686 | A | 4/1996 | Collier | 318/446 |
| 5,752,343 | A | 5/1998 | Quintus | 49/29 |
| 5,864,134 | A | 1/1999 | Burgess | 250/221 |
| 6,046,562 | A | 4/2000 | Emil | 318/484 |
| 6,326,754 | B1 | 12/2001 | Mullet et al. | 318/480 |
| 6,469,464 | B1 | 10/2002 | McCall | 318/445 |
| 6,476,732 | B1 | 11/2002 | Stephan | 340/988 |
| 6,563,278 | B2 | 5/2003 | Roman | 318/282 |
| 6,563,431 | B1 | 5/2003 | Miller, Jr. | 340/932.2 |
| 6,593,856 | B1 | 7/2003 | Madau | 340/825.69 |
| 6,634,408 | B2 * | 10/2003 | Mays | 160/188 |
| 6,989,760 | B2 | 1/2006 | Dierking et al. | 340/686.1 |
| 6,998,977 | B2 | 2/2006 | Gregori et al. | 340/505 |
| 7,002,312 | B2 | 2/2006 | Wojciak, Jr. | 318/452 |
| 2001/0013762 | A1 | 8/2001 | Roman | 318/282 |
| 2003/0071590 | A1 | 4/2003 | Roman | 318/282 |
| 2003/0174045 | A1 | 9/2003 | Zhang | 340/5.64 |
| 2004/0135531 | A1 | 7/2004 | Graham et al. | 318/442 |
| 2004/0216379 | A1 | 11/2004 | Gioia et al. | 49/29 |

(Continued)

FOREIGN PATENT DOCUMENTS

CA 2 331 544 A1 2/2002

(Continued)

OTHER PUBLICATIONS

Copy of International Search Report dated Dec. 13, 2007.

(Continued)

*Primary Examiner*—Lincoln Donovan
*Assistant Examiner*—Michael Brandt
(74) *Attorney, Agent, or Firm*—Renner Kenner Greive Bobak Taylor & Weber

(57) ABSTRACT

A system and method for unattended control of an access barrier comprises a barrier operator having a timer capable of being updated at predetermined intervals. The barrier operator is configured to receive an auto-close signal that is periodically sent from a wall station, keyless transmitter, or remote transmitter that is compatible with the barrier operator. When the auto-close mode is invoked, the barrier operator initiates the timer when it detects that the access barrier has been opened. As such, the access barrier is closed via the barrier operator when both the timer has expired, and the auto-close signal is received by the barrier operator from one of the transmitters.

13 Claims, 2 Drawing Sheets

U.S. PATENT DOCUMENTS

| | | | | |
|---|---|---|---|---|
| 2005/0012631 | A1 | 1/2005 | Gregori et al. | 340/686.1 |
| 2005/0140321 | A1 | 6/2005 | Wojciak, Jr. | 318/452 |
| 2005/0174250 | A1 | 8/2005 | Dierking et al. | 340/686.1 |
| 2005/0176400 | A1 | 8/2005 | Mullet et al. | 455/403 |
| 2005/0212681 | A1 | 9/2005 | Dzurko et al. | 340/632 |
| 2005/0218854 | A1 | 10/2005 | Gioia et al. | 318/599 |
| 2005/0236905 | A1 | 10/2005 | Tsai et al. | 307/116 |
| 2005/0237957 | A1 | 10/2005 | Autret et al. | 370/310 |
| 2006/0012325 | A1 | 1/2006 | Robb et al. | 318/466 |

FOREIGN PATENT DOCUMENTS

| | | | |
|---|---|---|---|
| DE | 199 14 111 | A1 | 9/2000 |
| EP | 0 913 979 | A2 | 6/1999 |
| WO | WO00/25479 | | 4/2000 |

OTHER PUBLICATIONS

Copy of Written Opinion dated Dec. 13, 2007.

* cited by examiner

SYSTEM AND METHOD FOR UNATTENDED CONTROL OF AN ACCESS BARRIER

TECHNICAL FIELD

Generally, the present invention relates to barrier operators used to move access barriers between limit positions. Specifically, the present invention relates to a barrier operator that is able to initiate unattended closing of an access barrier. Particularly, the present invention relates to an auto-close mode which is executed through the interaction between a remote transmitter and a barrier operator.

BACKGROUND

As is well known, access barriers, such as garage doors or gates enclose an area, and allow selective ingress and egress thereto. In the past, garage doors were moveable by hand, but due to their weight, and the inconvenience of opening and closing the door, motors were added to move the door between opened and closed limit positions. Control of the motor may be achieved by a hard-wired push button, which when actuated, sends a signal to a barrier operator that initiates the motor so as to move the door to one of its limit positions. After the door has stopped, and the button is pressed again, the barrier operator directs the motor to move the door in an opposite direction. In addition, to the basic motor control functions discussed, barrier operators are now provided with safety features, which stop and reverse the door travel when an obstruction is encountered. Other safety devices, such as photocells and sensors when combined with the barrier operator, detect whenever there is an obstruction within the path of the door and send a signal to the barrier operator to take corrective action. Remote control devices are now also provided to facilitate the opening and closing of the door without having to get out of the car. In addition to these basic features, the prior art also discloses various other features, which enhance the convenience of opening and closing an access barrier such as a garage door.

One feature offered by various barrier operators relates to an auto-close mode. The auto-close mode allows the barrier operator to close a currently opened access barrier without any interaction from the user or other individual. Such a feature allows a user that does not have a remote transmitter to exit an area whose access is controlled by the access barrier, while ensuring that the access barrier will close a short time later. As such, the auto-close mode of the barrier operator provides an enhanced level of security and convenience to its user. While several attempts have been made to provide a suitable auto-close feature, most attempts are lacking in one or more aspects, as discussed below.

For example, one attempt to provide a barrier operator with an auto-close mode is achieved by use of a delay-close button that is provided by a wireless wall station. When actuated, the delay-close button generates a signal received by the barrier operator which pauses for a predetermined period of time before the access barrier begins to close. Unfortunately, if a user forgets to press the delay-close button, the access barrier remains open allowing unwanted individuals to gain access to the area controlled by the access barrier.

Other barrier operator systems developed to provide an auto-close feature utilize a timing module that is configured to be added to an existing barrier operator installation. Once installed and configured, the timing module initiates a count once the access barrier is opened. If another command signal is not received by the barrier operator before the remaining time expires, then the barrier operator closes the access barrier. However, because the timing module is an add-on feature to an existing barrier operator, it may be improperly installed by an unqualified layperson. Moreover, due to the vast range of individual barrier operator models available on the market, an incompatibility may arise when the timing module is utilized therewith. As a result, the timing module may work improperly with a particular barrier operator, causing erratic and inconsistent actuation of the barrier operator.

There are also automatic controllers for barriers, such as garage doors, that are referred to as "hands-free" devices where the proximity of the mobile unit, in a car, to the stationary unit, in the garage, will open and close the barrier based on a number of conditions. One such device provides an automatic barrier operator system for operating a gate or upward acting garage door which includes a controller for operating a reversible motor, a base radio frequency transmitter and a base radio frequency receiver. One or more remote control units include a radio frequency remote receiver and remote transmitter. The controller is operable to automatically close or open the barrier in response to a query signal sent from the base transmitter to the remote receiver and when the remote receiver is within range, returning a signal to effect movement of the barrier. The system is operable to effect operation or maintain the status quo of the barrier depending on the state of the barrier and a particular signal or lack of signal received by the controller from an authorized remote control unit or units. The system provides essentially hands-free automatic operation of opening and closing a garage door and the like. Although these devices normally move the barrier from a non-user initiated command, there are no provisions to close the barrier after a period of time if for some reason the controller leaves the barrier in the open position.

Therefore, there is a need for a system and method for unattended control of an access barrier that provides a barrier operator that performs a timing function. In addition, there is a need for a system for unattended control of an access barrier that utilizes a remote transmitter or wall station which sends an auto-close signal to the barrier operator automatically, without being initiated by a user. Still yet, there is a need for a system for unattended control of an access barrier, wherein the auto-close signal sent by the remote transmitter, or wall station is sent periodically.

SUMMARY OF THE INVENTION

In light of the foregoing, it is a first aspect of the present invention to provide a system and method for unattended control of an access barrier.

It is another aspect of the present invention to provide a system for unattended control of an access barrier comprising a barrier operator to move the access barrier between opened and closed positions, the barrier operator having a timer set to an initial count value, the timer being periodically updated toward an expired count value when the access barrier is moved to an unclosed position, and a transmitter configured to automatically send periodic auto-close signals to the barrier operator, wherein the access barrier is moved from an unclosed position to a closed position, if the auto-close signal is received by the barrier operator, when the timer has reached the expired count value.

Yet another aspect of the present invention is a method for unattended control of an access barrier comprising providing a barrier operator to move the access barrier between opened and closed positions, the barrier operator having a timer set to an initial count value, transmitting a periodic auto-close signal, determining whether the access barrier has been moved to an unclosed position, activating the timer if the access barrier has been moved to an unclosed position, the timer generating an updated count value at predetermined intervals, and closing the access barrier when the timer has reached an expired count, and when the auto-close signal is received at the barrier operator.

BRIEF DESCRIPTION OF THE DRAWINGS

These and other features and advantages of the present invention will become better understood with regard to the following description, appended claims, and accompanying drawings wherein:

BEST MODE FOR CARRYING OUT THE INVENTION

Figure 1:
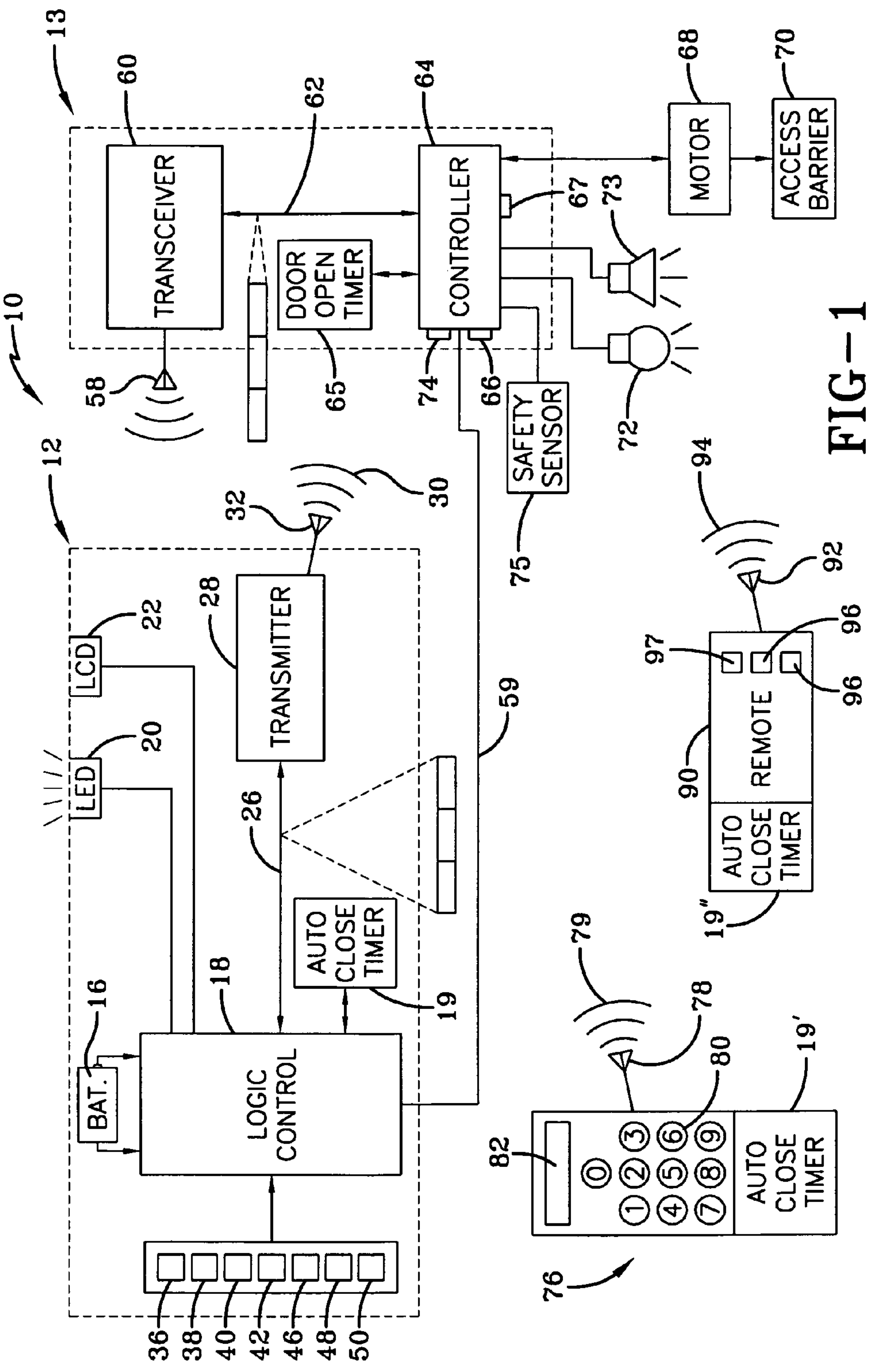
FIG. 1 is a block diagram showing a barrier operator, a wall station transmitter, a keyless transmitter, and a remote transmitter according to the concepts of the present invention.

A system and method for unattended control of an access barrier according to the concepts of the present invention, is generally indicated by the numeral 10, as shown in FIG. 1. The system 10 may be employed in conjunction with various movable access barriers, including doors or gates, wherein the doors may be of the type utilized for residential type garage doors, or garage doors for commercial and utility buildings, and other structures, as well as windows or other closure members, all of which may be linear, curved, or otherwise non-linear, in whole or in part. In addition, the access barriers may be constructed of a variety of materials such as wood, metal, various plastics, or combinations thereof. The lower extremity of doors or other access barrier may be substantially rectangular or may be profiled in any number of ways for the positioning of reinforcing members or other purposes.

Generally, the system 10 provided by the present invention employs a multi-function wall station transmitter generally designated by the numeral 12. The wall station transmitter 12 is used to control various functions provided by a barrier operator 13. Typically, the wall station transmitter 12 is placed near a pedestrian door that enters the garage from the interior of the house, and is positioned at a convenient height, ideally about five feet above the ground. The wall station transmitter 12 includes a housing that may be made of polymeric material, wherein at least a portion of the housing is removable to allow access to the internal workings thereof when needed.

The wall station transmitter 12 includes a battery compartment (not shown) for receiving a power supply 16, which may comprise two AAA batteries, or other suitable portable power source. The power supply 16 is used to provide electrical power to various components contained within the wall station transmitter 12. It will be appreciated that power could be received from a wired power source, such as a residential power source, mains power or equivalent by utilizing an appropriate electrical transformer. And, if desired, the power could be received directly from the operator 13. In any event, in this embodiment, the power supply 16 provides the necessary power, and allows the wall station transmitter 12 to be placed anywhere within communication range of the barrier operator 13, while eliminating the need for obtaining power directly from the barrier operator 13 or other wired power source.

One component coupled to the power supply 16, is a logic control 18, which is a microprocessor-based circuit that provides the necessary hardware, software and memory for implementing the functions to be described below. An auto-close timer 19 is coupled to the logic control 18, and is configured to increment or decrement count values in a manner to be discussed. It should also be appreciated that the timing functions provided by the auto-close timer 19 may be integrated into the control logic or software provided by the logic control 18. A light emitting diode (LED) 20 is connected to the logic control 18, and receives power from the power supply 16. Also connected to the logic control 18 may be a liquid crystal display (LCD) 22 or other suitable display, such as a low-power display. The LED 20 and the LCD 22 may provide various operational information related to the wall station transmitter 12 and/or other various components of the system 10 to be discussed.

The logic control 18 generates various signals 26 which are used by a transmitter 28 for conversion to one or more radio frequency (RF) command signals 30 that are emitted by an antenna 32. Of course other types of wireless signals, such as infrared or acoustic, could be generated by the transmitter 28 if desired. It should also be appreciated that a transceiver may replace the transmitter 28, so as to provide both a transmitting function and a receiving function that supports future operational functions provided by the operator 13. The transmitter 28 primarily emits command signals but may also function as a receiver so that data can be received by the wall station transmitter 12 from other various devices associated with the system 10 including the barrier operator 13. The term "transceiver" as used herein, indicates that the device can both transmit and receive wireless signals. While it should be appreciated that the wall station transmitter 12 is a wireless device capable of wireless transmission and reception of radio signals, it is also contemplated, as noted above, that the wall station transmitter 12 could be directly wired to the barrier operator 13, so as to communicate commands, other data, and supply power therebetween.

The wall station transmitter 12 includes an auto-close switch or button designated generally by the numeral 36. The auto-close switch 36 allows the wall station transmitter 12 to invoke an auto-close mode, which when invoked, causes the wall station transmitter 12 to transmit an auto-close signal or command to the barrier operator 13. The function of the auto-close mode and the interaction between the wall station transmitter 12 and the barrier operator 13 will be discussed in detail later.

In addition to the auto-close switch 36, the wall station transmitter 12 may include various other switches including: an up/down switch 38; a multi-selection switch 40, which provides the modes of normal operation, and radio frequency blocking; an install switch 42; a delay close switch 46; a pet height switch 48; and a light on/off switch 50. The up/down switch 38 is actuated whenever the user wants to move the barrier from an up condition to a down condition or vice versa. The multi-selection switch 40 provides for different operational modes that may be provided by the barrier operator 13. Briefly, when the system is in its normal operation mode user input is required to open and close the access barrier. The radio frequency blocking feature is for when a user is on vacation, and desires that no external or remote transmitters allow for operation of the access barrier. The install switch 42 provides for an installation routine to set the operational limits of an access barrier with respect to the other physical parameters of the access barrier. In other words, barrier travel limits and force profiles are generated during the actuation of the install routine. The delay close switch 46 allows for a user to exit the enclosed area within a predetermined period of time without inadvertently actuating safety features such as photoelectric eyes and the like. The pet height switch 48 allows for the access barrier to be moved to a minimal open position of anywhere from 4 to 12 inches to allow the ingress and egress of small pets. The light switch 50 turns a light associated with the system 10 on or off. Thus, the wall station transmitter 12 provides many functions that when selected result in the transmission of the appropriate command signal 30 to the barrier operator 13, where the function is carried out.

The barrier operator 13 includes an antenna 58 for receiving the RF command signals 30 sent from the wall station transmitter 12 or various other transmitters so as to control a function provided by the operator 13. However, it should be appreciated that in lieu of sending RF command signals 30, the wall station transmitter 12 may communicate command codes directly to the barrier operator 13 via a hardwired connection 59 if desired. Command signals 30 received by the antenna 58 of the barrier operator 13 are subsequently processed by a transceiver 60, which converts the command signals 30 into a code signal 62 that is received by a controller 64. Additionally, the barrier operator 13 may generate various control signals via the transmitting portion of the transceiver 60 so as to control a remote device such as a light, or to communicate with a transceiver equipped wall station 12. The controller 64 provides the necessary hardware, software and memory needed for carrying out and coordinating the various functions provided by the barrier operator 13.

A door open timer 65 may be coupled to the controller 64, so as to decrement a stored count value or to increment a stored count value. While the timer 65 may comprise a discrete component of the barrier operator 13, it should be appreciated that the timing function provided by the timer 65 may be integrated with the logic of the controller 64 or software executed by the controller 64. In addition, the timer 65 may be set to a desired count value, such as one hour, by depressing a sequence of buttons or a set button 66 provided by the barrier operator 13. Associated with the controller 64 may be an LED 67, which indicates the operational status of the controller 64. The controller 64 is coupled to a motor 68 that actuates an access barrier 70 between opened and closed positions via various drive and counterbalance mechanisms coupled therebetween. While the present discussion is directed to an access barrier 70 that comprises a garage door, such should not be deemed limiting, as the access barrier 70 may comprise a door, gate, awning, curtain or any other movable barrier as previously discussed.

A light 72 may be associated with the controller 64 for the purpose of illuminating the area enclosed by the access barrier 70, while a speaker 73 may be connected to the controller 64 and may be used to announce the state or mode that the barrier operator 13 is in. A transmitter program button 74 is connected to the controller 64 for the purpose of allowing programming of the wireless control devices, such as the wall station transmitter 12, and various other remote transmitters and the like to the barrier operator 13. The transmitter program button 74 must be actuated to place the barrier operator 13 in a program mode for the purpose of learning any one of the transmitters disclosed herein to the barrier operator 13. It will be appreciated that other methodologies could be employed to associate a remote transmitter with an operator. In addition, a safety sensor 75, such as a photo-electric safety sensor, door edge sensor or any other sensor, may be connected to the controller 64. The safety sensor 75, is provided to detect the presence of an object within the path of the access barrier 70, and causes the access barrier 70 to take corrective action by moving the access barrier in the opposite direction away from the obstruction.

In addition to the wall station transmitter 12, other external transmitters may be associated with the barrier operator 13, such as a keyless transmitter designated generally by the numeral 76. The keyless transmitter 76 provides an antenna 78 for transmitting various radio frequency (RF) command signals 79 to the barrier operator 13. In addition to the antenna 78, the keyless transmitter 76 also includes an auto-close timer 19', that is configured to increment or decrement a count in a manner to be discussed. The auto-close timer 19' may be coupled or incorporated into the logic or software of a suitable controller used to carryout the functions provided by the keyless transmitter 76. Continuing, the keyless transmitter 76 also includes a keypad 80, which allows for the user to enter a predetermined identification code associated with one or more functions that can be carried out by the barrier operator 13. For example, a numerical code, such as 1-2-3-4 may be provided to initiate the opening or closing of the access barrier 70, although any numeric or alpha-numeric code could be utilized. As a result of entering the appropriate code into the keyless transmitter 76, the appropriate command signal 79 is sent by the keyless transmitter 76 to the barrier operator 13. In addition, the keyless transmitter 76 may be configured, such that the auto-close mode provided by the system 10 may be invoked if a predetermined code associated with the auto-close mode is entered. In addition, the keyless transmitter 76 may be used to transmit an initial timer value to the door open timer 65 of the operator 13. In one aspect, it is contemplated that the door open timer 65 of the operator 13 may be initially configured with a value of one-hour, but by placing the operator 13 in a specific mode, the keypad 80 of the keyless transmitter 76 may be used to change the setting to any desired value, such as 10 minutes for example. A liquid crystal display 82 may also be associated with the keyless transmitter 76 if desired to display the operational status thereof.

Another type of external transmitter that may be used in association with the barrier operator 13, is a remote transmitter designated generally by the numeral 90. The remote transmitter 90 provides an antenna 92, which emits various radio frequency (RF) command signals 94 that are received by the antenna 58 of the barrier operator 13 for processing by the controller 64. It will be appreciated that the remote transmitter 90 may include its own controller for the purpose of generating the appropriate command signal. In addition, the remote transmitter 90 may include an auto-close timer 19" similar to the auto-close timer previously discussed with respect to the wall station transmitter 12, and keyless transmitter 76. Specifically the auto-close timer 19" is configured to increment or decrement count values in a manner to be discussed. Moreover, the auto-close timer 19" may be coupled to or incorporated with the logic or software maintained by the controller that is used to carry out the functions provided by the remote transmitter 90. To control one or more features associated with the barrier operator 13, the remote transmitter 90 may include a plurality of function buttons 96 that independently control such features. In particular, actuation of one of the buttons 96 may be used solely for control of the access barrier 70, while other buttons may independently control the light 72 associated with the barrier operator 13. In addition, the function buttons may include an auto-close button 97 that invokes the auto-close mode provided by the system 10, which will be discussed below.

Fixed code or rolling code technology may be used for communication of any of the transmitters 12,76,90 with respect to the barrier operator 13. And it will be appreciated that as the discussion proceeds, that the auto-close timers used with the various transmitters 12,76,90 operate in substantially the same manner.

As previously discussed, the system 10 provides an auto-close mode that may be activated or deactivated by selecting the auto-close switch 36 provided by the wall station transmitter 12, entering a predetermined code via the keyless transmitter 76, or selecting the auto-close button 97 provided by the remote transmitter 90. Briefly, when a compatible wall station transmitter 12, keyless transmitter 76 or remote transmitter 90 initiates the auto-close mode, the wall station transmitter 12, and transmitters 76,90 are configured to send a periodic auto-close signal to the barrier operator 13. The barrier operator 13 on the other hand is configured to receive the auto-close signals and to take certain action when certain conditions exist, which is the subject of the following discussion. Thus, it is apparent that the auto-close mode is achieved through the utilization of the wall station transmitter 12 or transmitters 76,90 in association with the barrier operator 13 that is configured to interact therewith. As such, the barrier operator 13 nor the wall station transmitter 12 or transmitters 76,90 are capable of carrying out the steps of the auto-close mode individually. Thus, in the event a user elects to add the auto-close mode to an installed barrier operator 13, he or she would be required to purchase a compatible wall-station transmitter 12 or transmitter 76,90 that is capable of co-acting with the barrier operator 13 in order to activate the auto-close feature. With this in mind, the particular steps taken by the barrier operator 13, the wall station transmitter 12, and the transmitters 76,90 when the auto-close mode is enabled will be set forth in the discussion below.

While the barrier operator 13, along with at least one wall station transmitter 12, keyless transmitter 76, or remote transmitter 90 are needed for the operation of the auto-close mode, the operational steps taken by each of the two entities—one operator and at least one transmitter—will be separately set forth, and a discussion of their interaction will follow.

Figure 2:
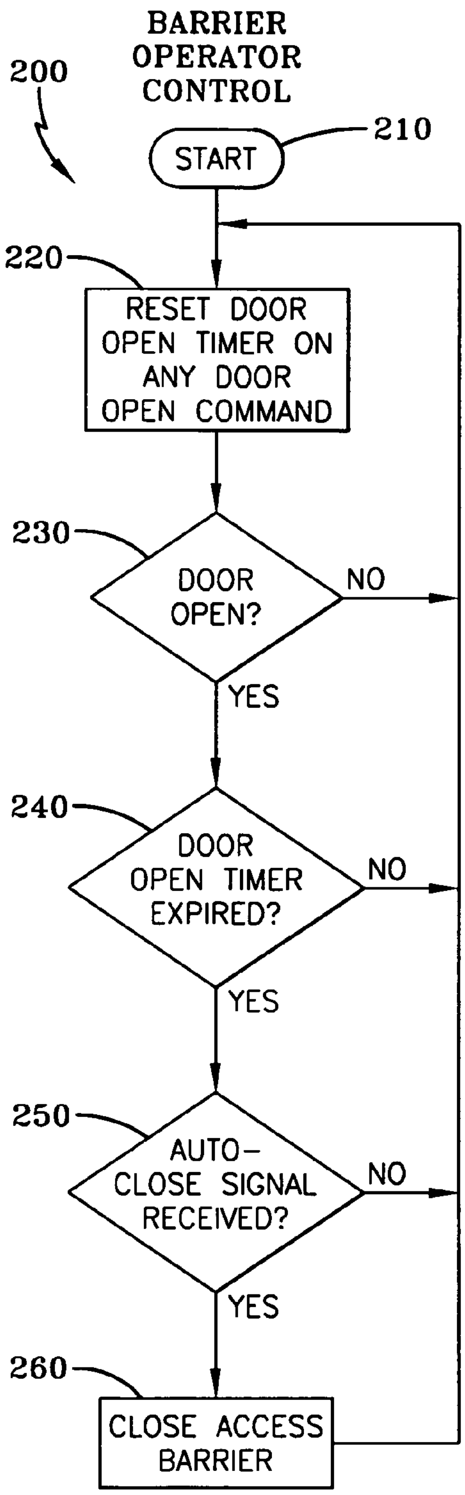
FIG. 2 is a flow chart showing the operational steps taken by the barrier operator when an auto-close mode is invoked according to the concepts of the present invention.

The operational steps associated with the auto-close mode taken by the barrier operator 13 are referred to by the numeral 200 and are shown in FIG. 2. Thus, as shown at step 210 in FIG. 2, the auto-close mode is started at the barrier operator 13. The auto-close mode may be initiated at the barrier operator 13 when the auto-close switch 36 of the wall station transmitter 12 is selected, the auto-close code is entered into the keyless transmitter 76, or the auto-close button 97 of the remote transmitter 90 is selected. Once the auto-close mode has been initiated by any one of the transmitters, the process 200 continues to step 220. At step 220 the door open timer 65 is set to a predetermined initial count value, which may be of any desired time duration. Next, at step 230, the barrier operator 13 determines whether the access barrier 70, referred to as a door throughout FIG. 2, has been moved to an open position or not. If the access barrier 70 has not been moved to an open position, which may also be referred to as a position other than closed, the process 200 returns to step 220 until the access barrier 70 moves to a not closed position. However, if at step 230 the user of the system 10 has initiated the movement of the access barrier 70 to a position other than closed, using either the wall station transmitter 12, or transmitters 76,90, the door open timer 65 is initiated and begins updating the stored predetermined initial count value. The door open timer 65 may be configured to update its predetermined count value by incrementing itself from a zero count to the predetermined count value stored in the door open timer 65, to thus indicate an expired count, or the timer may start from the predetermined count value and decrement itself to a zero count to thus indicate an expired count of the door open timer 65. It should be appreciated that the predetermined initial count value may be updated at any desired interval, such as every second, minute, or hour for example. Next, at step 240, the barrier operator 13 determines whether the access barrier 70 has been in an unclosed position for a period of time equal to the predetermined count value. That is, the barrier operator 13 determines whether access barrier 70 has been in an unclosed position when the timer 65 has reached an expired count. If the door open timer 65 has not reached an expired count, the process 200 returns to step 220. However, if the door open timer 65 has reached an expired count, the process 200 moves to step 250. Once at step 250, the barrier operator 13 determines whether an auto-close signal, periodically sent by the wall station transmitter 12, keyless transmitter 76, or remote transmitter 90 has been received. If the auto-close signal has not been received by the barrier operator 13, the process 200 returns to step 220. But, if the barrier operator 13 has received the auto-close signal from the wall station transmitter 12, the keyless transmitter 76, or the remote transmitter 90, then the barrier operator 13 proceeds to move the access barrier 70 to a closed position, as indicated at step 260. In one aspect of the system 10, the auto-close mode may be configured such that at step 260, the access barrier 70 may be moved to an intermediate position between fully opened and fully closed positions, and then after a predetermined period of time to a fully closed position. Furthermore, an audible or visual warning may be given at step 260, via the speaker 73 or the light 72 respectively, alerting the user that the access barrier 70 is about to be moved.

Figure 3:
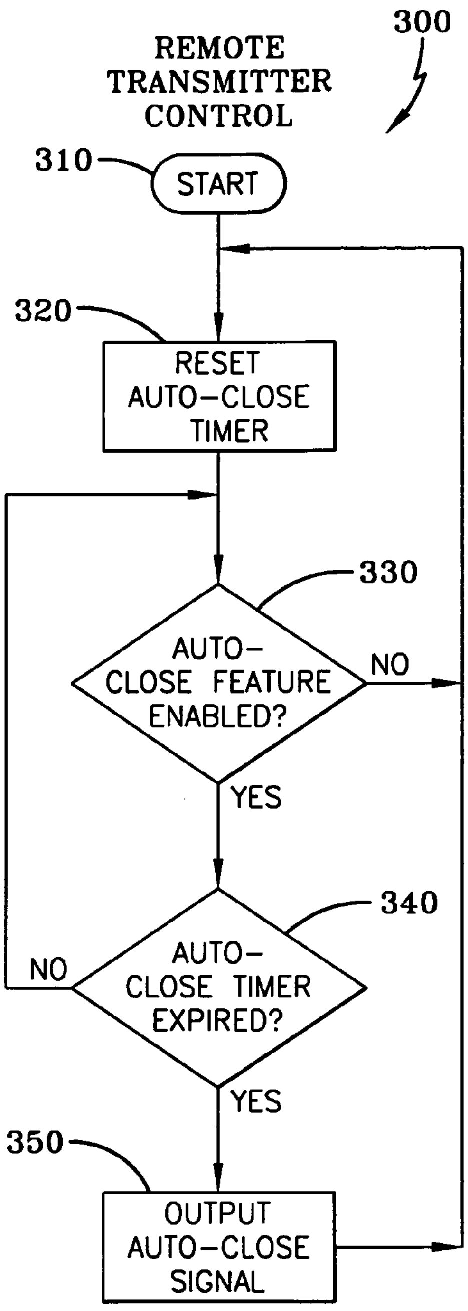
FIG. 3 is a flow chart showing the operational steps taken by the wall station transmitter, the keyless transmitter, or any type of remote transmitter when the auto-close mode is invoked according to the concepts of the present invention.

With the operational steps taken by the barrier operator 13 with respect to the auto-close mode set forth, the complementary operational steps designated generally by the numeral 300 taken by the wall station transmitter 12, the keyless transmitter 76, and the remote transmitter 90 shown in FIG. 3 will now be discussed. Initially, at step 310, the auto-close mode is started by actuating the auto-close switch 36 of the wall station transmitter 12, by entering an auto-close code into the keyless transmitter 76, or selecting the auto-close button 97 on the remote transmitter 90. When the auto-close mode is enabled, the process 300 moves to step 320 where the auto-close timer 19,19',19" associated with the respective transmitter 12,76, 90 is reset to a predetermined initial count value. Once reset at step 320, the auto-close timer 19,19',19" is activated and begins updating the initial count value. It is also contemplated that the predetermined count value used by the auto-close timer 19,19',19" may be any time period, such as 30 minutes, or an hour for example. The auto-close timer 19,19',19" may be configured to update its predetermined count value by incrementing itself from a zero count to the predetermined count value stored in the auto-close timer 19,19',19" to thus indicate an expired count, or may start from the predetermined count value and decrement itself to a zero count to thus indicate an expired count of the auto-close timer 19,19',19". It should be appreciated that the predetermined initial count value may be updated at any desired interval, such as every second, minute, or hour for example.

Once step 320 is complete, the process continues to step 330. If at step 330 the process 300 determines that the auto-close mode is not enabled, then the process remains at step 320 until the auto-close mode is enabled at the wall station transmitter 12, the keyless transmitter 76, or the remote transmitter 90. When the auto-close mode is activated, the process 300 continues to step 340, where the auto-close timer 19,19',19" is analyzed to determine if it has reached an expired count. If the auto-close timer 19,19',19" has not reached an expired count the process 300 returns to step 330. But if the auto-close timer 19,19',19" has reached an expired count the process continues to step 350, where the wall station transmitter 12, the keyless transmitter 76, or the auto-close button 97 transmits an auto-close signal to the barrier operator 13. After the auto-close signal has been transmitted, the process 300 returns to step 320 and the auto-close timer is reset. Thus, in summary, after each expired count is reached by the auto-close timer 19,19',19" the wall station transmitter 12, the keyless transmitter 76, or the remote transmitter 90 transmits an auto-close signal to the barrier operator 13. It should be appreciated that the auto-close mode may be overridden or otherwise rendered inactive by providing a suitable switch with the wall station transmitter 12, keyless transmitter 76, or the remote transmitter 90. Additionally, the pet height switch 48 may move the access barrier 70 to an intermediate position (i.e. unclosed), while disabling the auto-close mode, which would prevent the wall station transmitter 12/keyless transmitter 76/remote transmitter 90 from transmitting an auto-close close signal at step 340, or by preventing the barrier operator 13 from closing the access barrier 70 upon the receipt of the auto-close signal.

Thus, during operation of the auto-close mode, the processes 200 and 300 are carried out by the barrier operator 13, and the wall station transmitter 12/keyless transmitter 76/remote transmitter 90 respectively, and coact via the communication of the auto-close signal, as indicated at step 350 and step 250. As such, the auto-close timer 19,19',19" and the door open timer 65 allows the auto-close mode to close the access barrier 70 at step 260, when the access barrier 70 has been in an unclosed position for a predetermined period of time, and when an auto-close signal is received by the barrier operator 13.

It will, therefore, be appreciated that one advantage of one or more embodiments of the present invention is that a system for unattended control of a barrier operator is able to close an opened access barrier automatically after a predetermined period of time and an auto-close signal has been received. Still another advantage of the present invention is that the system for unattended control of a barrier operator is able to partially close the access barrier automatically after a predetermined period of time, when an auto-close signal has been received. Yet another advantage of the present invention is that the system for unattended control of a barrier operator requires utilizes a compatible wall station, or transmitters to invoke the auto-close mode.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto and thereby. Accordingly, for an appreciation of the true scope and breadth of the invention, reference should be made to the following claims.

What is claimed is:

1. A system for unattended auto-close control of an access barrier comprises:

a barrier operator to move the access barrier between opened and closed positions, said barrier operator having a timer set to an initial count value, said timer being periodically updated toward an expired count value when the access barrier is moved to an unclosed position; and a transmitter configured to automatically and continuously send an auto-close signal at periodic intervals to said barrier operator;

wherein the access barrier is moved from an unclosed position to said closed position, when said timer has reached the expired count value and said barrier operator receives said auto-close signal.

2. The system for unattended auto-close control of an access barrier of claim 1, wherein said transmitter comprises a wall station adapted to be placed within communication range of said barrier operator and near a pedestrian door of a garage associated with the access barrier.

3. The system for unattended auto-close control of an access barrier of claim 1, wherein said transmitter comprises a keyless transmitter adapted to be placed within communication range of said barrier operator.

4. The system for unattended auto-close control of an access barrier of claim 1, wherein said transmitter comprises a remote transmitter.

5. The system for unattended auto-close control of an access barrier of claim 1, wherein said auto-close signal is sent about every hour.

6. The system for unattended auto-close control of an access barrier according to claim 1, further comprising:

an auto-close switch carried by said transmitter, wherein said auto-close signal is automatically and continually generated only when said auto-close switch is in an on position.

7. The system for unattended auto-close control of an access barrier according to claim 1, wherein said timer is reset upon receipt of any door command received by said operator.

8. A method for unattended auto-close control of an access barrier comprising:

providing a barrier operator to move the access barrier between opened and closed positions, said barrier operator having a timer set to an initial count value;

continuously transmitting an auto-close signal at periodic intervals to said barrier operator from a transmitter;

determining whether the access barrier has been moved to an unclosed position;

activating said timer if the access barrier has been moved to said unclosed position, said timer generating an updated count value at predetermined intervals; and closing said access barrier when said timer has reached an expired count, and said barrier operator receives said auto-close signal.

9. The method for unattended auto-close control of an access barrier of claim 8, wherein said barrier operator comprises a controller, said controller configured to carry out the function of said timer.

10. The method for unattended auto-close control of an access barrier of claim 8, wherein said auto-close signal is sent about every hour.

11. The method for unattended auto-close control of an access barrier of claim 8, further comprising:

determining whether a user has initiated the closing of the access barrier prior to said first closing step.

12. The method for unattended auto-close control of an access barrier of claim 11, further comprising:

closing the access barrier if a user has initiated the closing of the access barrier prior to said first closing step.

13. The method for unattended auto-close control of claim 8 comprising:

mounting said transmitter near a pedestrian door of a garage associated with the access barrier, wherein said transmitter is in communication range with said barrier operator.

* * * * *